March 28, 1967     T. I'ANSON     3,311,220
ADJUSTABLE-PITCH SPROCKET WHEEL
Filed Nov. 25, 1964
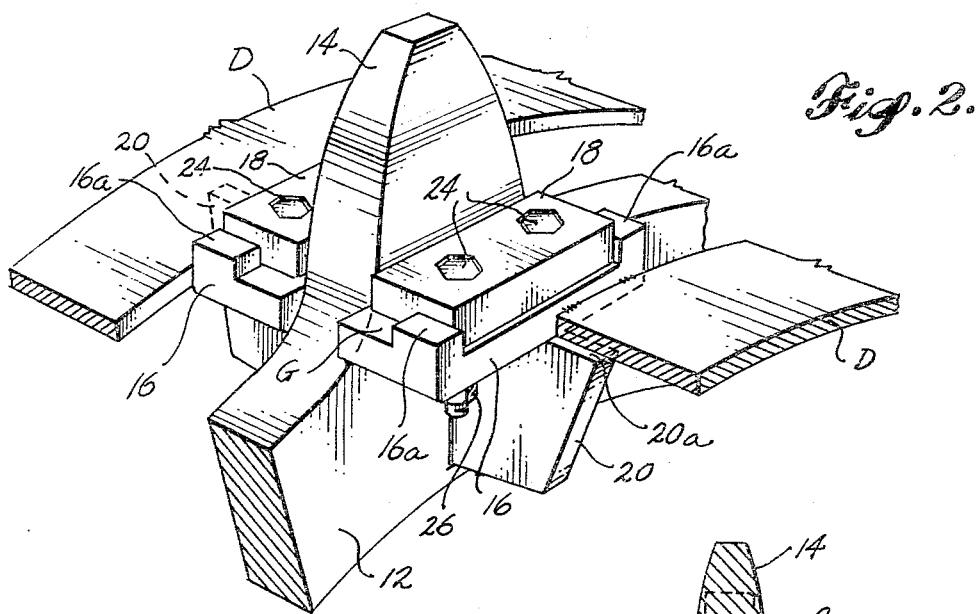
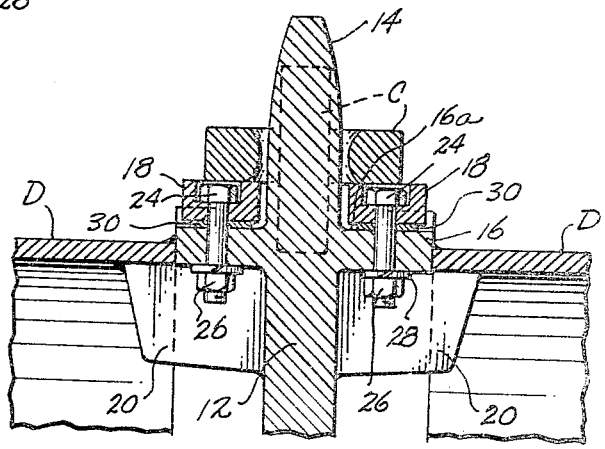
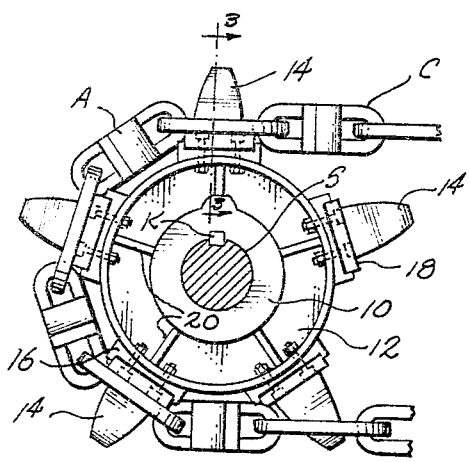
INVENTOR.
THOMAS I'ANSON
BY
*Orlando M. Christensen*
ATTORNEY United States Patent Office 3,311,220
Patented Mar. 28, 1967

3,311,220
ADJUSTABLE-PITCH SPROCKET WHEEL
Thomas l'Anson, Bellevue, Wash., assignor to l'Anson Industries, Inc., Seattle, Wash., a corporation of Washington
Filed Nov. 25, 1964, Ser. No. 413,749
12 Claims. (Cl. 198—168)

This invention relates to improvements in sprocket wheels wherein the relationship of a chain passing about such wheel to the pitch circle of the sprocket wheel is adjustable, and more particularly relates to improvements in those sprocket wheels and chains of the type referred to as skip-tooth sprockets for use in chain conveyor systems.

A broad object hereof is to provide such a sprocket wheel in which chain stretch or wear or sprocket wheel wear may be compensated by a relatively simple means not susceptible of malfunction or fluctuation in its setting, despite possible loosening of bolt or nut connections or other connecting devices used.

The invention is herein illustratively described by reference to the presently preferred embodiment thereof; however, it will be recognized that certain modifications and changes therein with respect to details may be made without departing from the essential features involved.

It has long been recognized that stretch and wear of conveyor chains and wear of sprocket surfaces necessitates radial adjustment of the chain-engaging sprocket wheel base surfaces in relation to the designed pitch circle of the wheel's teeth, in order that the chain links will again register correctly with the sprocket wheel teeth. Otherwise the chain or the sprocket wheel, or both, must be discarded prematurely. Adjustable-pitch sprocket wheels with the teeth themselves mounted for radial adjustment in relation to the sprocket wheel hub have been used, but are relatively expensive, and in particular were not wholly reliable because of difficulties arising from undesired changes of pitch distance due to fact that the mechanically adjustable supports for the individual teeth tended to work loose.

An object of this invention is to devise an adjustable-pitch sprocket wheel wherein even if the connecting elements, e.g., bolts and nuts, work loose the relation of the chain-engaging base surfaces to the sprocket wheel's pitch circle will be essentially unaffected thereby.

A further object hereof is to devise a positive and reliable adjustable-pitch skip-tooth sprocket wheel or the like having chain-engaging base surfaces provided by adjustably positioned members which are held positively in the desired position in both a radial and circumferential sense, without reference to fastening elements or the tightness of the connection thereof. A related object is to provide such a means in the form of wear pads or the like which are separate from and adjustable in relation to the individual sprocket teeth, thereby permitting the sprocket wheel as such to be cast as an integral one-piece unit and the aforementioned compensative adjustment which compensates for chain stretch and wear to be effectuated by independent positioning of the individual wear pads.

A further object hereof is to devise a relatively inexpensive, rugged, durable and easily adjustable conveyor chain sprocket wheel of the type described in which load forces are borne and transmitted directly through the unitary sprocket wheel structure without necessity for transmitting such loads through adjustable connecting elements, the latter serving in this case only to retain the wear pads in relative position wherein they transmit loads directly to the sprocket wheel structure.

In accordance with the invention as herein disclosed, the improved adjustable-pitch sprocket wheel comprises supporting shoulders integral with and projecting transversely from opposite sides of the individual sprocket teeth, at a location offset radially inwardly from the desired pitch circle, such shoulders having recesses or pockets directed radially outwardly to accommodate wear pads which are seated thereon, and usually bolted thereto, and the radially outer surfaces of which pads serve as the base surfaces engaged by the chain links, whereby such surfaces hold the chain in the desired pitch circle as it passes around the sprocket wheel. Such wear pads, when held to their supporting shoulders by bolts, may be shimmed outwardly therefrom by any desired amount to establish or adjust the circle defined by the chain, in relation to the intended pitch circle of the teeth, which relationship will remain constant thereafter despite any loosening of the bolts and nuts holding the wear pads in place, until such time as wear requires further adjustment by increased shim thickness. Circumferentially directed forces are preferably resisted by retaining elements at the ends of the shoulders. Under load, as compression is exerted on the wear pads by conveyor chain tension the latter are pressed firmly to their seat in the shoulder recesses, without regard to tightness or lack of tightness of the connecting bolts.

These and other features, objects and advantages of the invention will become more fully evident from the following description thereof by reference to the accompanying drawings, wherein the invention is illustrated in its presently preferred form.

FIGURE 1 is a side elevational view of the improved adjustable-pitch sprocket wheel engaged by a section of conveyor chain.

FIGURE 2 is an enlarged fragmentary isometric view of one tooth of the sprocket wheel and associated structure connected therewith.

FIGURE 3 is an enlarged sectional view taken on line 3—3 in FIGURE 1.

Referring to the drawings, the integral one-piece cast sprocket wheel structure comprises the hub 10 suitably apertured to accommodate a supporting shaft S, the annular wheel or web 12 having individual sprocket teeth 14 projecting from the periphery therof at regular intervals, and transversely projecting shoulders 16 at opposite sides of each tooth 14. Shoulders 16 have radially outer surfaces which are substantially flat except for stops or bosses 16a at opposite ends thereof, the purpose of which is to define a recess or pocket in which is retained the detachable rectangular wear pads 18. Reinforcing gussets 20 outstanding from respectively opposite faces of the sprocket wheel 12, in the axial direction at right angles to the plane of the wheel, support the shoulder members 16 against radially inward deflection. These gussets extend outwardly beyond the shoulder member 16, to provide ledges 20a which serve as supports for guide drums D, which may be welded or otherwise secured in place in coaxial alignment on respectively opposite sides of the sprocket wheel, for a purpose to be described.

The wheel disk has been described as being of integral make-up, which in fact it is, but preferably it is made up of two portions, joined together. Hub 10, while it could be cast integrally with the sprocket wheel 12, is preferably formed separately, and is conveniently welded in place within the sprocket wheel. In this manner the sprocket wheel and integral teeth 14 may be cast of a tough metal which is very hard or which work hardens, such as manganese steel, whereas the hub may be formed of a softer metal which may be machined out more readily, to accommodate the shaft S and a keyway for the key K.

As depicted, wear pads 18 rest in use upon the associated supporting shoulders 16, received within pockets defined by the bosses 16a. Both shoulders have aligned apertures which pass the securing bolts 24 through them, the bolt heads being recessed in complementally formed pockets in the upper radially outer surfaces of the wear pads, and the lower ends of the bolts pass through the shoulders to receive the nuts 26 and lock washers 28. Preferably two such bolts are used to secure each wear pad in place upon the shoulder, with the lower face of the wear pad bearing directly against the upper face of the shoulder, or against annular washers or other shimming elements 30 interposed therebetween as a means to establish or reestablish the radius of the radially outer surfaces of the wear pads, in correct relation to the pitch circle of the sprocket wheel. Thus, a conveyor chain C passing around the sprocket wheel has its engagement with the individual sprocket teeth 14 and with the wear pads 18, as depicted in FIGURE 1. The oppositely projecting cantilevered cleats or arms A, typical of conveyors used in lumber mills and the like, are carried by the links which intervene those engaging the sprocket teeth and wear pads. These cleats or arms A may be even several feet in length and, in case they tend to tilt and thus to twist the chain and to misalign the chain links with the sprocket teeth, are restricted in their tilting by conact with he drums D.

If it should become necessary to adjust the effective pitch radius of the base circle defined by the wear pads, all that is necessary is to loosen the nuts 26 from the bolts 24 and remove the bolts, and then to insert thicker wear pads, or preferably to insert between the wear pads 18 and the shoulder surfaces shims 30 of different (greater) thickness. Thereupon reassembly of the parts restores the sprocket wheel and its chain to correctly functioning condition, with the chain pushed radially outwardly to correct its relationship with the wheel's pitch circle. Obviously, circumferentially directed load forces acting on the wear pads are positively resisted by the radially projecting stops 16a, and need not be (and preferably are not) resisted by the connecting bolts 24. Furthermore, should the nuts 26 work loose on the bolts, it does not affect the pitch relationship of the chain and the sprocket wheel because pressure of contact of the chain links directed radially inwardly of the sprocket wheel simply forces the wear pads firmly against the shims, and they in turn against the shoulders 16, such that a direct compressional column of elements resisting loading is maintained, which transmits chain load directly to the sprocket structure without reliance upon the connecting bolts for transmission of such forces.

In the example the stops 16a are located at the outer corners of the shoulder 16 and do not extend along the full projecting width of the shoulders. The resultant gap or space G is for convenience in manufacture of the sprockets using standard foundry practices, and specifically permits use of a grinding wheel across the full circumferential extent of the corner defined between the side of the tooth and the adjacent radially outer surface of the shoulder so as to remove from the corner any excess materials which preclude firm and uniform seating of the wear pad against the shoulder face, as desired.

These and other aspects of the invention will be evident from the foregoing and accompanying description and illustration thereof by reference to its presently preferred embodiment.

I claim as my invention:

1. A sprocket wheel construction especially adapted for use with a conveyor chain, to maintain said chain during use in predetermined relation to the pitch circle of the teeth of the sprocket wheel, said wheel comprising a disk having sprocket teeth formed integrally therewith, a shoulder outstanding at the sides of each tooth, and a separate wear pad supported upon the radially outer surface of each shoulder for engagement by the chain, the chain-engaging surface whereof is thereby located in predetermined relation to the designed pitch circle of the sprocket wheel's teeth.

2. A sprocket wheel as in claim 1, including means interengageable between each shoulder and its wear pad, to prevent displacement of the wear pad circumferentially relative to said shoulder.

3. A sprocket wheel as in claim 1, wherein each shoulder is formed with circumferentially spaced bosses, upstanding from its radially outer surface, and each wear pad is complementally formed to fit between said bosses, to prevent circumferential displacement of the wear pad relative to the bosses.

4. A sprocket wheel as in claim 3, wherein the bosses are located spaced outwardly from the corner where the tooth and the shoulders join.

5. A sprocket wheel as in claim 1, wherein each shoulder is formed integrally with the disk.

6. A sprocket wheel as in claim 3, wherein the bosses are located spaced outwardly from the corner where the tooth and the shoulders join.

7. A sprocket wheel as in claim 6, wherein the gussets extend in the axial direction beyond the corresponding shoulder, and hollow drums supported upon the gusset extensions.

8. A sprocket wheel as in claim 1, including at least one bolt projecting in a radial direction through each wear pad and its shoulder, with its head engaging the wear pad, and a retaining nut fitting the radially inner end of the bolt, beneath the shoulder.

9. A sprocket wheel as in claim 1, wherein the wheel is made up of a circumferential portion, including the teeth and shoulders, of a tough, wear-resistant metal, and a hub or mounting portion of a more readily machined metal, the two portions being joined integrally.

10. A conveyor chain and a sprocket wheel about which said chain runs, said sprocket wheel having its teeth formed integrally therewith, shoulders outstanding at the sides of each tooth, at a predetermined distance radially inward of the designed pitch circle of the teeth, wear pads removably supported upon each shoulder to define chain-engaging surfaces to limit radially inward movement of the chain, and of a thickness to locate the chain in its designed relation to such pitch circle, and means interengageable between each wear pad and its supporting shoulder to prevent circumferential displacement of the wear pad.

11. A conveyor chain and related sprocket wheel as in claim 10, wherein the chain includes at intervals laterally outstanding cleat elements, and drums supported from and at each side of the wheel, by their engagement by the cleat elements preventing material twisting of the chain.

12. A conveyor chain and related sprocket wheel as in claim 10, including shim means interposed between each shoulder and its wear pad, and of a thickness to compensate for wear and elongation of the chain.

References Cited by the Examiner
UNITED STATES PATENTS 2,101,685  12/1937  Nisbet _____ 198—203 X EVON C. BLUNK, *Primary Examiner.*

E. A. SROKA, *Assistant Examiner.*